United States Patent

Mongeau

[11] Patent Number: 5,917,295
[45] Date of Patent: Jun. 29, 1999

[54] MOTOR DRIVE SYSTEM HAVING A PLURALITY OF SERIES CONNECTED H-BRIDGES

[75] Inventor: Peter Mongeau, West Borough, Mass.

[73] Assignee: Kaman Electromagnetics Corporation, Hudson, Mass.

[21] Appl. No.: 08/594,816

[22] Filed: Jan. 31, 1996

[51] Int. Cl.⁶ .................. H02P 1/00; H02P 5/40
[52] U.S. Cl. .................. 318/254; 318/138; 318/290; 318/293
[58] Field of Search .................. 318/138, 254, 318/245, 439, 256–293, 599; 388/902; 363/40, 89, 98

[56] References Cited

U.S. PATENT DOCUMENTS

| | | | |
|---|---|---|---|
| 4,467,407 | 8/1984 | Asano et al. | 363/43 |
| 4,719,551 | 1/1988 | Nishizawa et al. | 363/41 |
| 4,730,242 | 3/1988 | Divan | 363/37 |
| 4,829,416 | 5/1989 | Inaba et al. | 363/41 |
| 4,845,417 | 7/1989 | Ohkubo et al. | 318/696 |
| 4,851,753 | 7/1989 | Hamilton | 318/609 |
| 5,172,309 | 12/1992 | DeDoncker et al. | 363/132 |
| 5,280,228 | 1/1994 | Kanouda et al. | 318/803 |
| 5,291,388 | 3/1994 | Heinrich | 363/98 |
| 5,332,954 | 7/1994 | Lankin | 318/139 |
| 5,428,522 | 6/1995 | Millner et al. | 363/63 |
| 5,486,747 | 1/1996 | Welch | 318/811 |
| 5,561,595 | 10/1996 | Smith | 363/37 |
| 5,568,034 | 10/1996 | Huggett et al. | 318/802 |
| 5,576,943 | 11/1996 | Keir | 363/56 |

*Primary Examiner*—Paul Ip
*Attorney, Agent, or Firm*—McCormick, Paulding & Huber

[57] ABSTRACT

A motor drive system for selectively supplying a drive current to a multiple phase motor having each phase winding divided into a plurality of discrete windings includes a plurality of H-bridge drives to control the polarity and magnitude of the drive current. Each H-bridge drive include a pair of half bridge drives interconnected to the terminals of each of the discrete windings. Each of the half bridges have an upper bridge switching element and a lower bridge switching element for coupling the positive and negative potential, respectively, of a DC power source to each discrete winding. The discrete windings of each phase winding are coupled in series by a plurality relays which are selectively actuated by a controller to interconnect the discrete windings in predetermined groups dependent upon the shaft speed of the motor. The controller also controls the excitation of the bridge switching elements whereby the bridge switching elements disposed at the end terminals of each group of discrete windings are actuated and the other bridge switching elements are turned off to provide the desired current to the phase windings of the motor.

20 Claims, 5 Drawing Sheets

MOTOR DRIVE SYSTEM HAVING A PLURALITY OF SERIES CONNECTED H-BRIDGES

FIELD OF THE INVENTION

The present invention relates generally to motor drive systems and deals more specifically with a motor drive system having a plurality of H-bridge drives connected in series capable of being selectively configured for providing an excitation circuit optimized for various operating modes of the motor.

BACKGROUND OF THE INVENTION

There are a host of applications which use a solid state controlled variable speed drive to operate an electric motor under various torque and speed conditions. Generally, the power source for these drives is a constant voltage supply. A typical configuration is a direct current (DC) source connected to an array of solid state bridges which are, in turn, connected to an alternating current (AC) motor. The solid state switches typically use pulse width modulation (PWM) to control the polarity and magnitude of the drive current being delivered to the motor and in this way control drive torque and speed of the motor in a maximum operating mode when drive torque and speed of the motor is at a maximum and in a minimum operating mode when the torque and speed of the motor is at a minimum.

One problem with this approach is that the performance of the motor and associated drive control circuits exhibit switching losses and PWM losses in the motor windings at partial load and speed. One reason for these losses is that at lower speeds the motor impedance and effective back electromagnetic force (emf) are decreasing which puts increasing demands on the inverter which is operating predominantly in the buck mode. This condition at partial speeds is particularly severe in marine type applications where the load torque varies quadratically with the shaft speed of the motor. This situation is exacerbated by the fact that operation of many naval drives are predominantly at partial speed.

In addition as the motor size and output power requirements increase, the excitation voltage and/or current associated with a single set of motor windings may exceed the ratings of the solid state switches that drive the motor windings. One method of overcoming this problem is to combine multiple solid state switches in series and/or in parallel. Another common method is to divide the motor windings into a number of discrete windings such that the voltage and current excitation required to drive each discrete winding is matched with the rating of a single switch.

SUMMARY OF THE INVENTION

It is the general object of the present invention to provide a motor drive system that reduces the switching losses and PWM motor losses associated with operating a motor at partial speed for a motor which has high torque and speed requirements.

It is another object of the present invention to provide a motor drive system capable of reconfiguring the motor phase winding at various operating modes to optimize the excitation circuit at partial load and speed of the motor.

According to the present invention, a circuit for use in a motor drive system for providing drive current to an electrical motor having multiple phase windings, each of which have a plurality of discrete windings, includes an H-bridge circuit coupled to each discrete motor winding. A pair of half bridge circuits, each comprising an upper and lower bridge switching element, are respectively connected to the terminals of each discrete winding to form the associate H-bridge. The pair of half bridges couple the discrete winding to a positive potential of a DC power source and to a negative potential of the power source. Controlled switching of the bridge switching elements provide the required drive current to the motor windings. At least one winding switching means selectively configures in series the discrete windings of each phase winding.

According to another aspect of the present invention, a motor drive system for use in a motor drive system for providing drive current to an electrical motor having multiple phase windings, each of which have a plurality of discrete windings, includes an H-bridge circuit coupled to each discrete motor winding. A pair of half bridge circuits, each comprising an upper and lower bridge switching element, are respectively connected to the terminals of each discrete winding to form the associate H-bridge. The pair of half bridges couple the discrete winding to a positive potential of a DC power source and to a negative potential of the power source. Controlled switching of the bridge switching elements provide the required drive current to the motor windings. At least one winding switching means receives switch control signals for selectively configuring in series the discrete windings of each phase winding. A winding control means receives a motor signal representative of a motor response parameter generates the switch control signals. A bridge control means receives an external command signal and a motor signal representative of a motor response parameter for generating excitation signals for selectively operating the bridge switching elements of the half bridges for generating drive current through each of the discrete windings of the phase windings of the motor.

According to a further aspect of the present invention, a motor system comprising an electrical motor having multiple phase windings, each of which include a first and second discrete winding. A sensor generates signals indicative of a motor operating parameter. Each discrete motor winding is coupled to an H-bridge circuit including a pair of half bridge circuits, each comprising an upper and lower bridge switching element. Each half bridge circuit is respectively connected to the terminals of each discrete winding to form the associate H-bridge. The pair of half bridges couple the discrete winding to a positive potential of a DC power source and to a negative potential of the power source. Controlled switching of the bridge switching elements provide the required drive current to the motor windings. At least one winding switching means receives switch control signals for selectively configuring in series the discrete windings of each phase winding. A winding control means receives a motor signal representative of a motor response parameter and generates the switch control signals. A bridge control means receives an external command signal and a motor signal representative of a motor response parameter for generating excitation signals for selectively operating the bridge switching elements of the half bridges for generating drive current through each of the discrete windings of the phase windings of the motor.

The above and other objects and advantages of this invention will become more readily apparent when the following description is read in conjunction with the accompanying drawings.

DETAILED DESCRIPTION OF THE PREFERRED EMBODIMENTS

Figure 1:
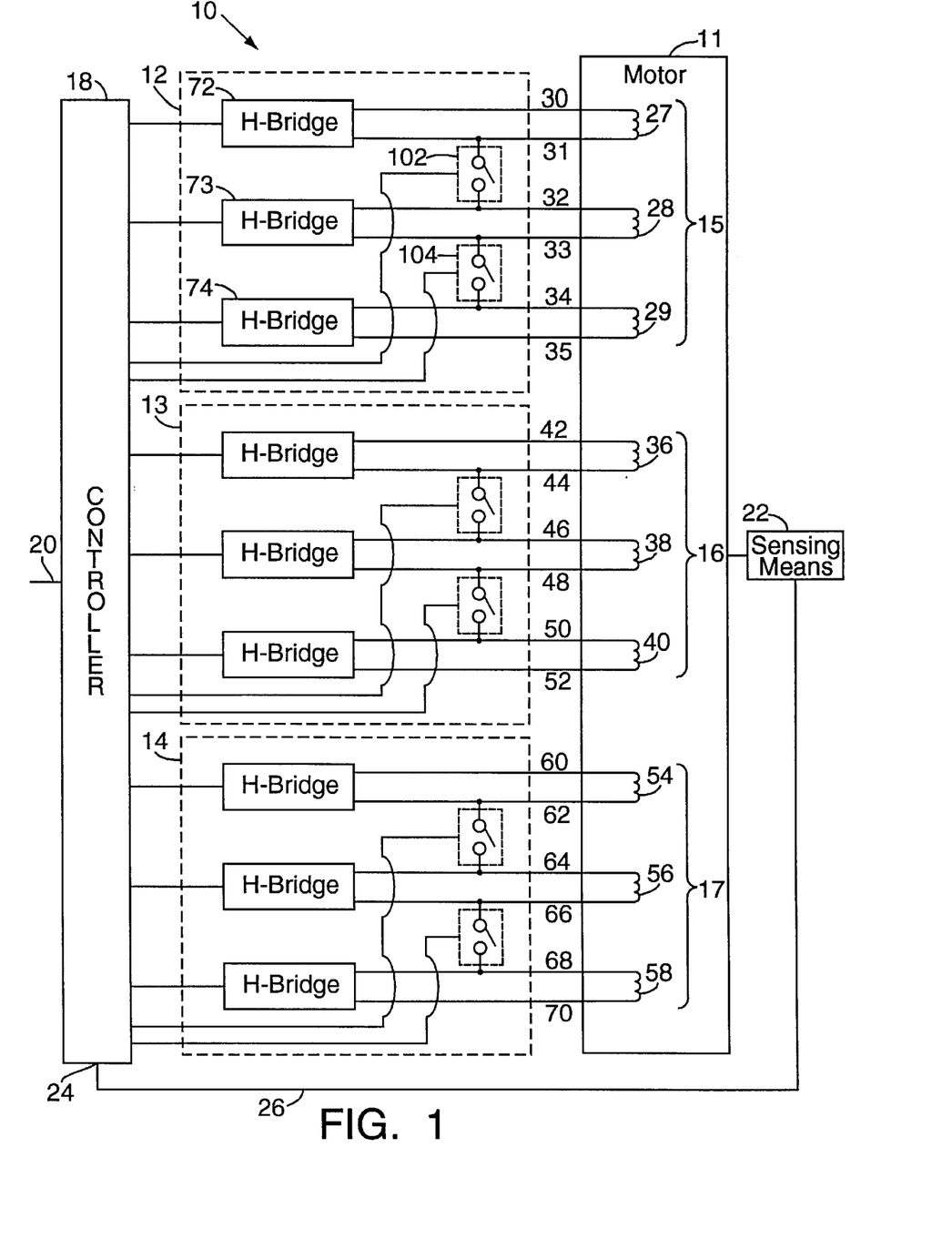
FIG. 1 is a schematic functional block diagram illustrating a general drive system of the, present invention.

A motor drive system for providing drive current to an inductive load such as motor windings for a three phase alternating current (AC) motor 11 provided in accordance with the present invention is illustrated in FIG. 1 and generally designated 10. The drive system includes a plurality of H-bridge drive circuits 12, 13, 14 that provide an associate excitation voltage and current to each of the respective phase windings 15, 16, 17 of the AC motor 11. The H-bridge drive circuits 12, 13, 14 are typically driven by pulse width modulation signals provided by a controller 18 for controlling the magnitude and polarity of the drive current provided to the motor phase windings.

The controller 18 executes a control algorithm that provides a plurality of pulse width modulation signals to control each of the bridge switching elements of the H-bridges included in each of the H-bridge drive circuits 12–14 based upon various input signals such as motor parameters, i.e. motor current, position and speed of the motor shaft, and an input command signal from an external control source 20. The position and speed of the motor is measured by any conventional sensing means 22 such as a resolver and provided to input 24 of the controller 18 via conductor 26.

Figure 2:
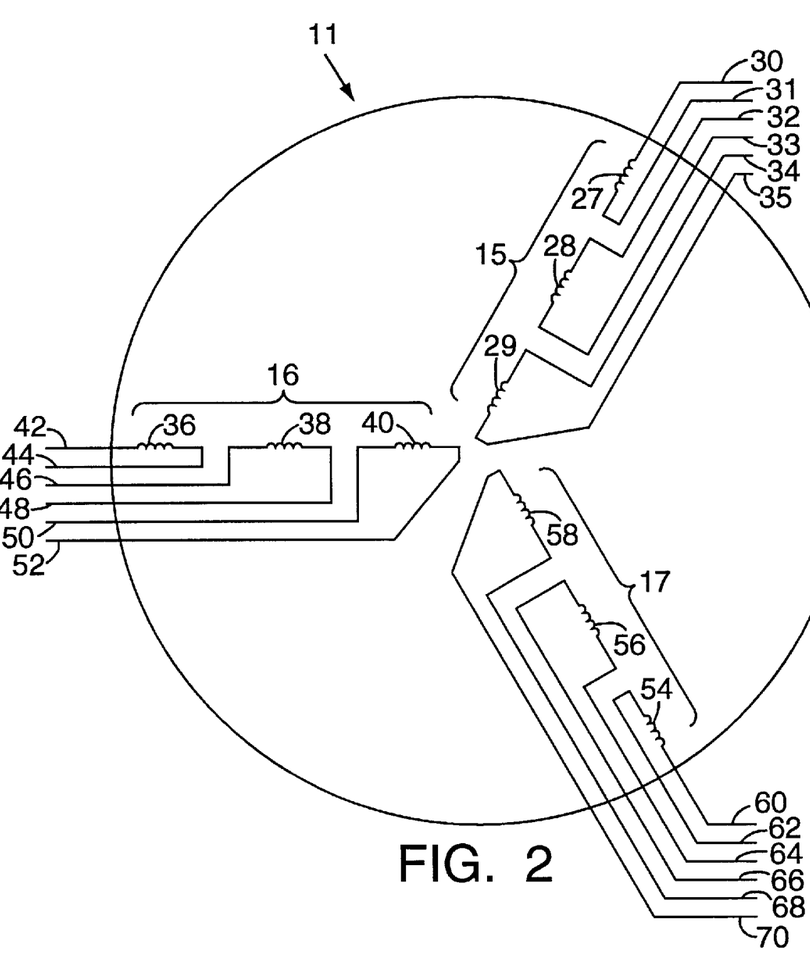
FIG. 2 is a schematic representation of the motor windings a the motor controlled by the system of FIG. 1.
Figure 3:
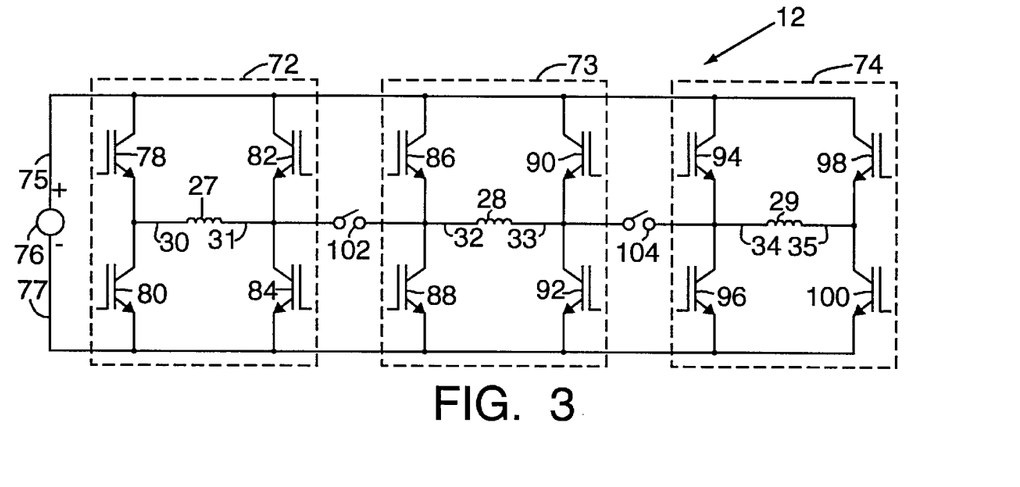
FIG. 3 is an electrical circuit schematic diagram showing an embodiment of the H-bridge drive circuit of the present invention for a single motor winding and configured in a maximum operating mode.

The three phase AC motor 11 of the type used in the motor drive system, as illustrated in FIGS. 1 and 2, includes three motor phase winding 15, 16, 17 coupled to an associated AC excitation voltage provided by H-bridge drive circuits 12, 13, 14 respectively. The AC voltage generated is typically represented by Phase A, Phase B. and Phase C whereby Phase A voltage is provided to phase winding 15, Phase B voltage is provided to phase winding 16, and Phase C voltage is provided to phase winding 17. Each of the phase windings is divided into a plurality of discrete windings. Phase winding 15 is divided into three discrete windings 27, 28, 29 with each of its respective terminals 30–35 connected to a plurality of half bridges representative of Phase A of the associated excitation voltage, as illustrated in FIG. 3. Likewise, phase winding 16 is divided into three discrete windings 36, 38, 40 with each of its respective terminals 42, 44, 46, 48, 50, 52 connected to a plurality of half bridges representative of Phase B of the associated excitation voltage. Phase winding 16 likewise is divided into three discrete windings 54, 56, 58 with each of its respective terminals 60, 62, 64, 66, 68, 70 connected to a plurality of half bridges representative of Phase C of the associated excitation voltage. It should be recognized by one skilled in the art that each of the phase windings may be divided into any number of discrete windings without departing from the teachings of the present invention.

Figure 4:
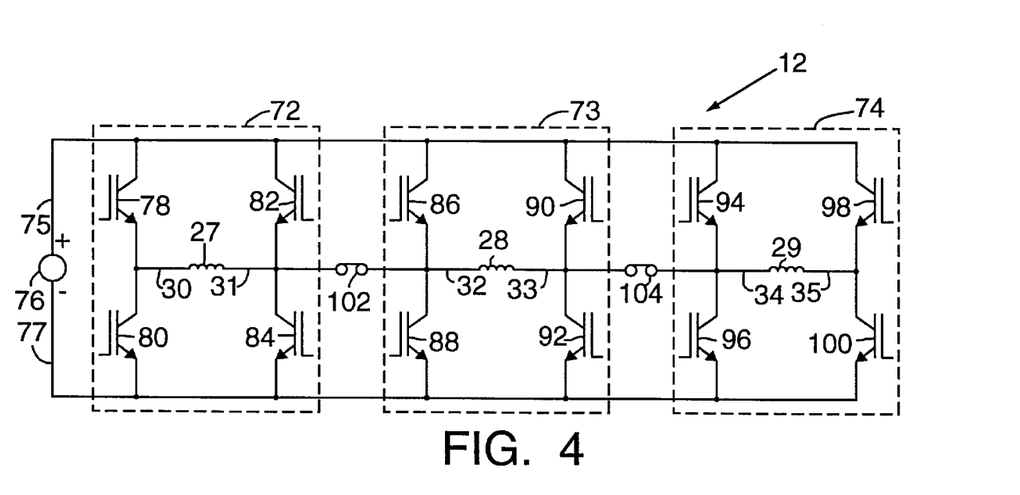
FIG. 4 is an electrical circuit schematic diagram of the embodiment of FIG. 1 configured in a partial operating mode.

The drive circuits 12–14 controlling each phase winding 15–17 respectively are the same, and therefore only a detailed explanation will be given for the drive circuit 12 for the Phase A winding 15, as illustrated in FIGS. 3 and 4, with the understanding that the drive circuits 13, 14 for Phase B winding 16 and Phase C winding 17 respectively is substantially identical. The half bridges connected to each respective terminal of each discrete winding 27, 28, 29 forms three H-bridges 72, 73, 74. Discrete winding 27 of Phase A winding 15 has its terminal 30 coupled to a positive potential 75 of a direct current (DC) power source 76 through bridge switching element 78 and to a negative potential 77 of the DC power source 76 through bridge switching element 80. Terminal 31 of discrete winding 27 is coupled to the positive potential 75 of the DC power source through bridge switching element 82 and to the negative potential 77 of the power source through bridge switching element 84.

Likewise, discrete winding 28 of Phase A winding 15 has its terminal 32 coupled to the positive potential 75 of the DC power source 76 through bridge switching element 86 and to the negative potential 77 of the DC power source through bridge switching element 88. Terminal 33 of discrete winding 28 is coupled to the positive potential 75 of the DC power source 76 through bridge switching element 90 and to the negative potential 77 of the power source through bridge switching element 92.

Discrete winding 29 of Phase A winding 15 has its terminal 34 coupled to the positive potential 75 of the DC power source 76 through bridge switching element 94 and to the negative potential 77 of the DC power source 76 through bridge switching element 96. Terminal 35 of discrete winding 29 is coupled to the positive potential 75 of the DC power source 76 through bridge switching element 98 and to the negative potential 77 of the power source through bridge switching element 100. The bridge switching elements are preferably an insulated gate bipolar transistor (IGBT) but may be any other comparable switching device, such as metal oxide semiconductor field effect transistors (MOSFETs), silicon controlled rectifiers (SCRs) and gate turnoff thyristors (GTOs).

In a preferred embodiment shown in FIGS. 3 and 4, discrete winding 27 at terminal 31 is coupled to terminal 32 of discrete winding 28 by winding switching element 102, and discrete winding 28 at terminal 33 is coupled to terminal 34 of discrete winding 29 by winding switching element 104 to connect the discrete winding 27, 28, 29 in series.

Switching elements 102, 104 are typically mechanical relays, however they may be of any suitable switching means capable of carrying the drive current associated with operation of the motor at partial speed. The controller 18 provides an output signal to control the actuation of winding switching elements 102, 104 based upon the shaft speed of the motor. The winding switching elements 102, 104 are closed when the motor 11 is operating at partial shaft speeds and open when the motor is operating at maximum speed.

The winding switching elements 102, 104 may be adapted to operate only as a disconnect device and may not be required to interrupt or open under load. Therefore, winding switching elements 102, 104 may be made to open and close under no load conditions, or when minimal or no drive current is being supplied to the motor windings. Moreover, the winding switching elements 102, 104 need only be sized for carrying partial drive current at full voltage resulting in smaller, less costly switching elements because the switching elements are closed only when the motor is operating at partial speed.

In the motor operating mode for maximum shaft speed and motor output power conditions, a high drive current must be supplied to the phase motor windings 15, 16, 17. To provide the required current to the motor windings to drive the motor 11 in this mode, each discrete winding 27, 28, 29 is independently excited to prevent the excitation voltage and/or current associated with the bridge switching elements from exceeding their ratings. While in the motor operating mode for partial speed and power conditions, the motor back emf decreases which puts increasing switching demands on the H-bridges 72–74 which is operating predominantly in the buck mode. Selective actuation of relays 102, 104 and excitation of the bridge switching elements results in an effective voltage which better matches the voltage of the fixed DC power source 76. The matching translates to lower PWM frequency for the same ripple current or lower ripple current for the same PWM frequency. More importantly, only a fraction of the switches are active in the partial operating mode resulting in elimination of associated switching losses and PWM losses in the motor and increased efficiency at partial motor speeds.

FIG. 3 illustrates the state of relays 102, 104 during the motor operating mode for maximum speed and output power conditions. In this maximum operating mode, relays 102, 104 are open to thereby isolate each of the discrete windings 27, 28, 29. Their respective H-bridges 72, 73, 74 control the current through its respective discrete winding 27, 28, 29 resulting in all of the switching elements for the Phase A motor winding 15 being excited. Specifically, bridge switching elements 78, 80, 82, 84 are selectively excited to conduct current from the positive potential 75 and negative potential 77 of the DC power source 76 across the discrete winding 27. Likewise, bridge switching elements 86, 88, 90, 92 are selectively excited to conduct current from the positive potential 75 and negative potential 77 of the DC power source 75 across the discrete winding 28. Switching elements 94, 96, 98, 100 are similarly selectively excited to conduct current from the positive potential 75 and negative potential 77 of the DC power source 75 across the discrete winding 29.

FIG. 4 illustrates the state of relays 102, 104 during the motor operating mode for lower shaft speed and partial motor output power conditions. In this partial operating mode, relays 102, 104 are closed to thereby connect each of the discrete windings 27, 28, 29 in series. Half bridge composing of bridge switching elements 78, 80 and half bridge composing of bridge switching element 98 and 100 are excited to form an H-bridge to simultaneously provide current across the discrete windings 27, 28, 29 connected in series, while all the other bridge switching elements are deactivated. Specifically, only bridge switching elements 78, 80, 98, 100 are selectively excited to conduct current from the positive potential 75 and negative potential 77 of the DC power source 76 across the discrete windings 27, 28, 29.

Figure 5:
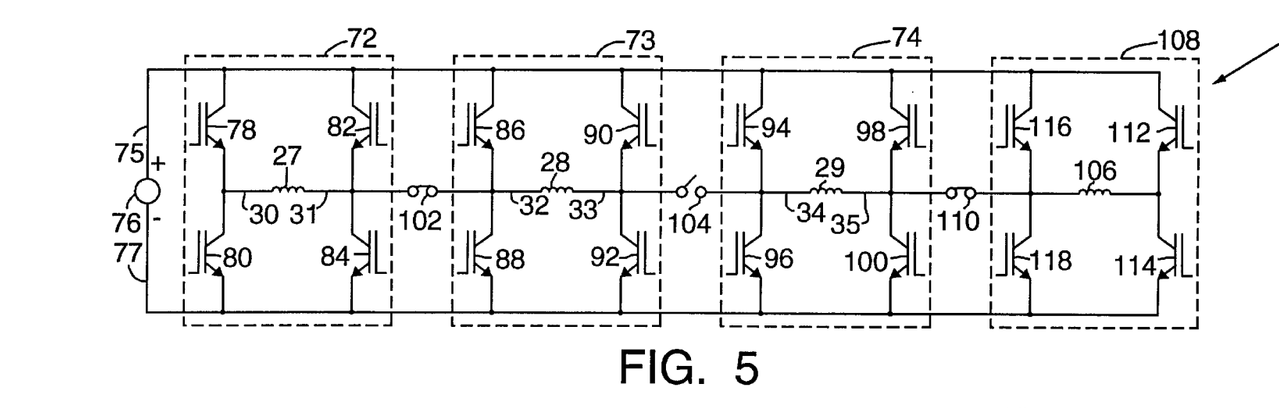
FIG. 5 is an electrical circuit schematic diagram of a second embodiment of the present invention configured in an intermediate operating mode.

Another embodiment of the present invention of a motor drive system is illustrated in FIG. 5 and generally designated 101 wherein the Phase A winding 15 is divided into four discrete windings 27, 28, 29, 106 and associated H-bridges 72, 73, 74, 108 are similar to those described above. The additional discrete winding 106 and H-bridge 108 are coupled in series with terminal 35 of discrete winding 29 by winding switching element 110. The addition of the fourth discrete winding 106 permits the Phase A winding 15 to be configured in three operating modes, maximum operating mode, intermediate operating mode and minimum operating mode. The state of the relays 102, 104, 110 are open in the maximum operating mode and closed in the minimum operating mode, as previously described.

The configuration of the motor winding in the intermediate operating mode provides a motor back emf coefficient intermediate of that provided in the maximum and minimum operating modes for improved matching with the source voltage. In the intermediate operating mode for intermediate shaft speed and intermediate motor output power conditions, relays 102, 110 are closed and relay 104 is open, as shown in FIG. 5. Half bridges composed of bridge switching elements 78, 80, 90, 92 are excited to provide a drive current to discrete windings 27, 28 connected in series while bridge switching elements 82, 84, 86, 88 are deactivated; and half bridges composed of bridge switching elements 94, 96, 112, 114 are excited to provide a drive current to discrete windings 29, 106 connected in series while bridge switching elements 98, 100, 116, 118 are deactivated.

Figure 6:
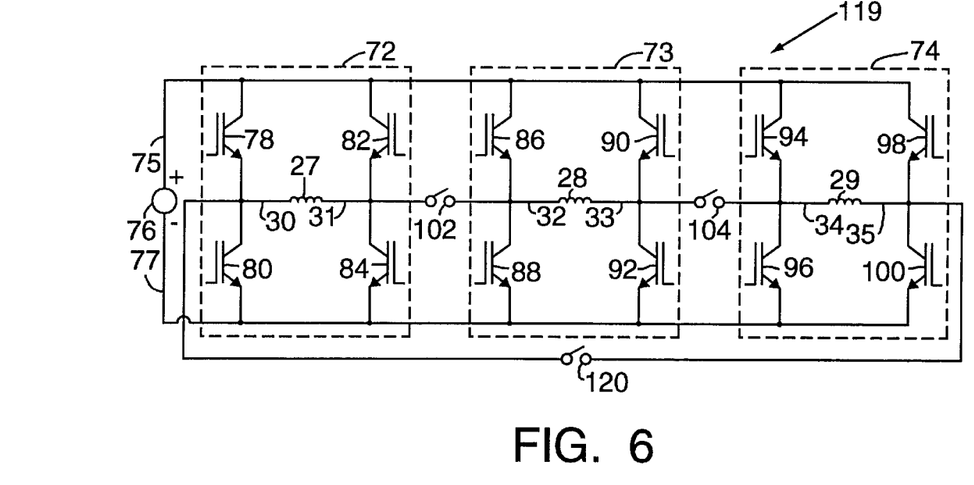
FIG. 6 is an electrical circuit schematic diagram of a third embodiment of the present invention configured in the maximum operating mode.

Another embodiment of the present invention of a motor drive system is illustrated in FIG. 6 and generally designated 119 wherein a winding switching element 120 similar to winding switching elements 102, 104 is added to the embodiment illustrated in FIGS. 3 and 4 for coupling terminal 30 of discrete winding 27 and terminal 35 of discrete winding 29. Switching element 120 permits a number of possible configurations of motor windings for the partial operating mode. For example, if relay 120 is opened and relays 102, 104 are closed, the motor drive is configured identical as the configuration illustrated in FIG. 4 and operates as previously described. If relay 104 is open and relays 102, 120 are closed, only half bridge composing of bridge switching elements 90, 92 and half bridge composing of bridge switching element 94, 96 are excited to form an H-bridge to provide drive current across the discrete windings 27, 28, 29 connected in series, while all the other bridge switching elements are deactivated.

A third configuration (not shown) for the partial operating mode is achieved by opening relay 102 and closing relays 104, 120. As one can see, this embodiment 119 permits three different configurations to operate the motor 11 in the partial operating mode. The added winding switching element 120 provides redundancy to the motor drive system by allowing different pairs of half bridges to be excited in the partial operating mode should one of the bridge switching elements fail. For example, if bridge switching element 78 fails, the drive system 119 is still capable of operating at partial speed in either the second or third configuration described above. This redundancy is important to many military applications, especially naval motor drive systems.

Figure 7:
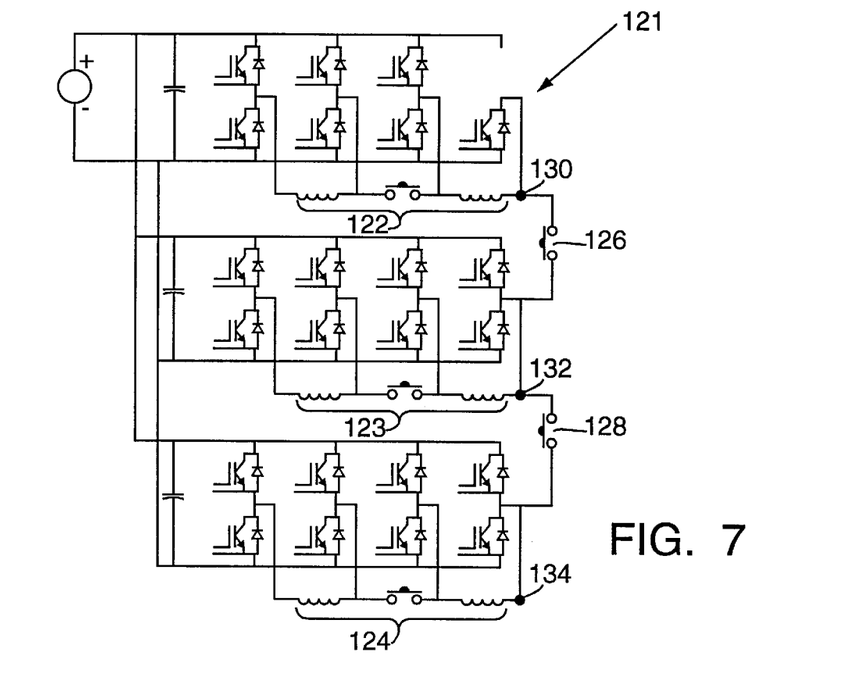
FIG. 7 is an electrical circuit schematic diagram of a fourth embodiment of the present invention wherein the motor windings are selectively connected in a wye configuration.

Still another embodiment of the present invention is illustrated in FIG. 7 and generally designated 121 wherein an H-bridge drive circuit, similar to that described above in FIG. 3, may be selectively reconfigured to operate in a combined wye configuration. The embodiment illustrated in FIG. 7 includes a pair of phase switching elements 126, 128 coupling the terminals 130, 132, 134 of their respective phase windings 122, 123, 124 which permits the phase winding to be selectively configured between a combined H-bridge and wye configuration, and an H-bridge configuration. When phase switching elements 126, 128 open, the drive system operates the same as the embodiment previously described in FIGS. 3 and 4. When the phase switching elements 126, 128 are closed, the drive system operates in a wye configuration.

Figure 8:
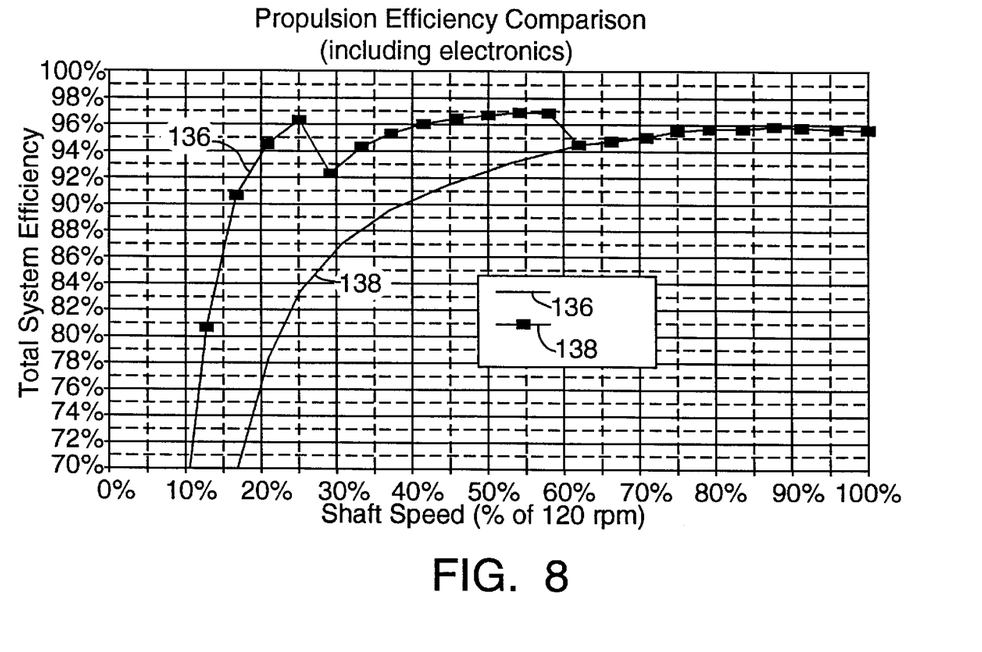
FIG. 8 is a graphical representation of the total system efficiency versus motor speed for a motor drive control system of the type of the present invention and for a standard fixed H-bridge drive control system.

The diagrammatic plot of FIG. 8 illustrates the improved efficiency of the motor drive system of the type of the present invention illustrated in FIGS. 3 and 4 compared to the efficiency of a standard, fixed configuration. The standard, fixed configuration independently controls the discrete windings of each motor by its associated H-bridge similar to the configuration illustrated in FIG. 3 at both partial and maximum operating shaft speeds. The y-axis of the plot represents the total system efficiency (including the electronics) and the x-axis represent the percentage of the shaft speed of the motor at 120 rpm. Curve 136 represents the efficiency of the standard fixed configuration and curve 138 represents the efficiency of the motor control of the present invention. As expected, the efficiency at high speeds for both configurations are the same, however, the configuration as described above for partial speeds of the present invention shows a substantial increase in efficiency at the lower speeds than the standard fixed configuration.

Although the invention has been shown and described with respect to a preferred embodiment thereof, it will be understood by those skilled in the art that various changes, omissions and additions thereto may be made therein without departing from the spirit and scope of the present invention.

Having thus described my invention, what is claimed is:

1. A circuit for use in a motor drive system for providing drive current to an electric motor having multiple phase windings, each phase winding including a plurality of discrete windings, the motor drive system further including a sensing means for generating a motor signal indicative of a motor operating parameter, a winding control means for generating a switch control signal in response to the motor signal, and a bridge control means for selectively generating excitation signals in response to an external command signal and the motor signals, said circuit comprising:

a plurality of H-bridge circuits, each H-bridge circuit being coupled to each discrete motor winding of each phase winding, each H-bridge circuit comprising a first half bridge and a second half bridge, said first half bridge including a first upper bridge switching element coupling a first terminal of the discrete winding to a positive potential of a direct current (DC) power source and a first lower bridge switching element coupling said first terminal of the discrete winding to a negative potential of the power source, and said second half bridge including a second upper bridge switching element coupling a second terminal of the discrete winding to said positive potential of said power source and a second lower bridge switching element coupling said second terminal of the discrete winding to said negative potential of said power source;

said bridge switching elements of said half bridges for each phase winding being selectively activated for providing drive current through each discrete windings of each respective phase windings in response to the excitation signals; and a switching means for selectively connecting each discrete winding of each respective motor phase winding in series in response to the switch control signal.

2. A circuit for use in a motor drive system as defined in claim 1, wherein said bridge switching elements are solid state switches.

3. A circuit for use in a motor drive system as defined in claim 1, wherein said switching means are mechanical relays.

4. A circuit for use in a motor drive system as defined in claim 1, further comprising a plurality of phase switching means, each phase switching means coupling one end terminal of a phase winding to one end terminal of another phase winding to form a wye configuration when said phase switching means are closed.

5. A motor drive system for providing drive current to an electric motor having multiple phase windings, each phase winding including a plurality of discrete windings; the motor drive system comprising:

a plurality of H-bridge circuits, each H-bridge circuit being coupled to each discrete motor winding of each phase winding, each H-bridge circuit comprising a first half bridge and a second half bridge, said first half bridge including a first upper bridge switching element coupling a first terminal of the discrete winding to a positive potential of a direct current (DC) power source and a first lower bridge switching element coupling said first terminal of the discrete winding to a negative potential of the power source, and said second half bridge including a second upper bridge switching element coupling a second terminal of the discrete winding to said positive potential of said power source and a second lower bridge switching element coupling said second terminal of the discrete winding to said negative potential of said power source;

said bridge switching elements of said half bridges for each phase winding being selectively activated for providing drive current through each discrete winding of each respective phase windings in response to excitation signals;

a winding switching means for selectively connecting each discrete winding of each respective motor phase winding in series in response to a switch control signal;

a sensing means for generating a motor signal indicative of a motor operating parameter;

a winding control means for generating the switch control signal in response to the motor signal; and a bridge control means for selectively generating excitation signals in response to an external command signal and the motor signal.

6. A motor drive system as defined in claim 5, wherein said bridge switching elements are solid state switches.

7. A motor drive system as defined in claim 5, wherein said winding switching means are mechanical relays.

8. A motor drive system as defined in claim 5, wherein said sensing means provides a motor signal indicative of the motor speed.

9. A motor drive system as defined in claim 5, wherein said winding control means provides switch control signals to open all of said winding switching means if the motor signal is greater than a predetermined parameter.

10. A motor drive system as defined in claim 9, wherein said predetermined parameter is an indication of the motor operating a maximum speed.

11. A motor drive system as defined in claim 5, wherein said winding control means provides switch control signals to close all of said winding switching means if the motor signal is less than a predetermined parameter.

12. A motor drive system as defined in claim 11, wherein said predetermined parameter is indicative of the motor operating at partial speed.

13. A motor drive system as defined in claim 5, wherein said winding control means provides switch control signals to close at least one of said winding switching means of each of said phase windings if the motor signal is less than a predetermined parameter.

14. A motor drive system as defined in claim 13, wherein said predetermined parameter is an indication of the motor operating at partial speed.

15. A motor drive system as defined in claim 5, wherein said winding switching means switch only if motor current across said discrete windings is at a minimum.

16. A motor drive system as defined in claim 5, wherein the excitation signals are pulse width modulated.

17. A motor drive system as defined in claim 5, wherein said bridge control means provides excitation signals only to half-bridges connected to outer terminals of series-connected discrete windings, and said first and second terminals of individual discrete windings.

18. A motor drive system as defined in claim 5, wherein said winding switching means connect said discrete windings in series in a circular configuration for permitting any pair of half bridges to selectively drive current through the series connected discrete windings when the motor is operating at partial speed by selectively opening any one of said winding switching means and closing said other winding switching means.

19. A motor drive system as defined in claim 5, further comprising a plurality of phase switching means, each phase switching means coupling one end terminal of a phase winding to one end terminal of another phase winding to form a wye configuration when said phase switching means are closed.

20. A motor system comprising:
an electric motor having multiple phase windings, each phase winding including a plurality of discrete windings;

a plurality of H-bridge circuits, each H-bridge circuit being coupled to each discrete motor winding of each phase winding, each H-bridge circuit comprising a first half bridge and a second half bridge, said first half bridge including a first upper bridge switching element coupling a first terminal of the discrete winding to a positive potential of a direct current (DC) power source and a first lower bridge switching element coupling said first terminal of the discrete winding to a negative potential of the power source, and said second half bridge including a second upper bridge switching element coupling a second terminal of the discrete winding to said positive potential of said power source and a second lower bridge switching element coupling said second terminal of the discrete winding to said negative potential of said power source;

said bridge switching elements of said half bridges for each phase winding being selectively activated for providing drive current through each discrete winding of each respective phase windings in response to excitation signals;

a winding switching means for selectively connecting each discrete winding of each respective motor phase winding in series in response to a switch control signal;

a sensing means for generating a motor signal indicative of a motor operating parameter;

a winding control means for generating the switch control signal in response to the motor signal; and a bridge control means for selectively generating excitation signals in response to an external command signal and the motor signal.

\* \* \* \* \*